United States Patent [19]

Pontius

[11] Patent Number: 4,504,290

[45] Date of Patent: Mar. 12, 1985

[54] ODOR FILTER MEDIA

[75] Inventor: Harold T. Pontius, Dublin, Ohio

[73] Assignee: Columbus Industries, Inc., Ashville, Ohio

[21] Appl. No.: 620,761

[22] Filed: Jun. 14, 1984

[51] Int. Cl.$^3$ .............................................. B01D 53/04
[52] U.S. Cl. ....................................... 55/316; 55/387; 55/486; 55/524; 55/528; 210/502.1; 210/504; 210/505
[58] Field of Search .................. 55/316, 387, 486, 512, 55/524, 528; 210/502, 504, 505, 508, 510.1

[56] References Cited

U.S. PATENT DOCUMENTS 3,019,127  1/1962  Czelwonka et al. ................... 55/524
4,046,939  9/1977  Hart ................................... 55/524 X
4,139,354  2/1979  Giles ...................................... 55/387

*Primary Examiner*—Charles Hart
*Attorney, Agent, or Firm*—Francis T. Kremblas, Jr.

[57] ABSTRACT

An improved filter construction for odor adsorption adapted to fit into a frame provided with front and rear support faces. The filter media consists of one or more sheets of non-woven material impregnated with activated carbon particles. Each sheet is provided with a plurality of slit and expanded openings to permit gaseous flow through said sheet. The sheet material comprises a combination of cellulose and synthetic fibers in a weight percentage range of between at least 30 to 50 percent of cellulose fibers and 1 to 10 percent of synthetic fibers wherin the combination of the two fibers represent at least 40 percent of the total composition of the sheet. The activated carbon content is between 35 to 50 percent of the total composition by weight. A latex binder material and a wet strength resin are included for fabrication of the sheet and to reduce dusting of the charcoal. A flame retardant material may be included to the composition of the sheet in an amount sufficient to meet fire codes standard as required.

3 Claims, 2 Drawing Figures

ODOR FILTER MEDIA

BACKGROUND OF THE INVENTION

Gas phase filter media for odor adsorption have long been used in many applications. Typical applications may include ductless range hood filters, air cleaner filters and filter systems for air conditioning, heating and ventilating systems. Offensive odors normally involved include those such as generated by cooking, pets or human waste.

Particulate filter media, such as expanded aluminum, fiber glass or the like may be combined with a gas phase odor adsorption media if the given application also requires removal of particulate matter.

One of the most common media forms employed for odor adsorption includes a bed of activated carbon particles. This type of filter media consists of some form of a bed of activated carbon particles supported in a given manner between appropriate layers of other media or a metal frame to form a compartment to contain the particles in the desired configuration.

Examples of such gas phase filters are disclosed in U.S. Pat. Nos. 3,630,007; 2,544,733; 3,873,287 and 3,645,072.

These carbon bed filters present two disadvantages in typical air movement systems. Often the pressure drop through the filter is too large for economical operation and generally such filters are relatively expensive to manufacture and fabricate. Another disadvantage in certain types of carbon beds is the tendency for the particles to settle and form a non-uniform filter media path.

Another form of gaseous filter media for odor control in disclosed in U.S. Pat. No. 4,227,940 and consists of a perforated sheet of metal or laminate material in which carbon particles are bonded to the sheet in a relatively random manner. The perforations are created by merely punching holes in the sheet upon which the carbon particles are adhesively bonded. This type of filter is designed for use in moving air systems in which pressure drop through the filter is an important consideration.

Another type of filter media is disclosed in U.S. Pat. No. 3,870,495 and comprises a non woven laid fiber material for use in filters.

Among the considerations important in filter applications of the type mentioned above is the balance achieved between efficiency of odor removal, resistance to air flow and cost of manufacture. Generally, in prior art constructions, improvement in odor removal efficiency and capacity is off-set by an increase in air flow resistance and results in a higher pressure drop. This creates an increase in the operating cost of the system in addition to an increase in the manufacturing cost of the filter media.

The prior art media employing carbon bonded to a metal or laminate sheet provided with holes, while achieving a degree of success and market acceptance, is less than fully satisfactory in achieving an improved relationship between removal efficiency, resistance to air flow and cost of manufacture.

SUMMARY OF INVENTION

The present invention relates generally to gaseous filtration media and specifically to a novel filter media construction which comprises a non-woven sheet material which is impregnated with activated carbon. The sheet is slit and expanded in a commercially acceptable manner on automatic slit and expanding machinery to provide pathways for the flow of gaseous fluids through the sheet.

The non-woven sheet filter media comprises a combination of both cellulosic type fibers and synthetic fibers in an appropriate combination to provide the proper characteristics to permit both impregnation with a sufficient amount of activated carbon and workability for the slit and expanding process.

The slit and expanded carbon impregnated sheet provides a unique filter media for odor removal in that the expanded openings not only reduce flow resistance but also tend to create pathways having greater surface area for intimate contact between the air flow and the activated carbon carried in the sheet material.

By using the automated slit and expanding machinery, the sheet material may be processed very efficiently and relatively inexpensively, while providing enhanced filter media characteristics and utilizing the whole of the base sheet material. Further, the slit and expanded openings formed may be readily varied in size to adjust the air flow characteristics to meet a wide range of applications.

Increasing the size of the expanded openings has an expected effect of reducing the pressure drop, surprisingly however, it has been discovered that the adsorption efficiency does not decrease in a similar proportion compared to providing a similar increase of open areas in prior art media forms. Therefore, a filter design is now possible employing the media of the present invention wherein greater odor removal efficiency can be maintained at the same or even less pressure drop through the filter compared to prior art odor filter media constructions.

Further, a plurality of such sheets may be layered according to the specifications of a given application without any major change in manufacturing requirements of the base sheet material.

OBJECTS

It is a primary object of the present invention to provide an improved gaseous filter media for moving air systems for odor control or for use in combined odor and particulate filters which is relatively more efficient and less expensive to manufacture than prior art filter media.

It is another object of the present invention to provide a filter media of the type described which comprises a slit and expanded non-woven sheet material which is impregnated with activated charcoal to provide improved gaseous adsorption efficiency at lower pressure drops through the filter than comparable prior art media.

It is another object of the present invention to provide a filter media of the type described wherein the carbon impregnated non-woven sheet material can be slit and expanded using automatic equipment for low cost high volume production.

It is a further object of the present invention to provide a filter media of the type described wherein the loading of the activated carbon and the slit and expanded openings can be adjusted in a relatively simple manner to meet a wide range of applications as may be required.

DETAILED DESCRIPTION

Figure 1:
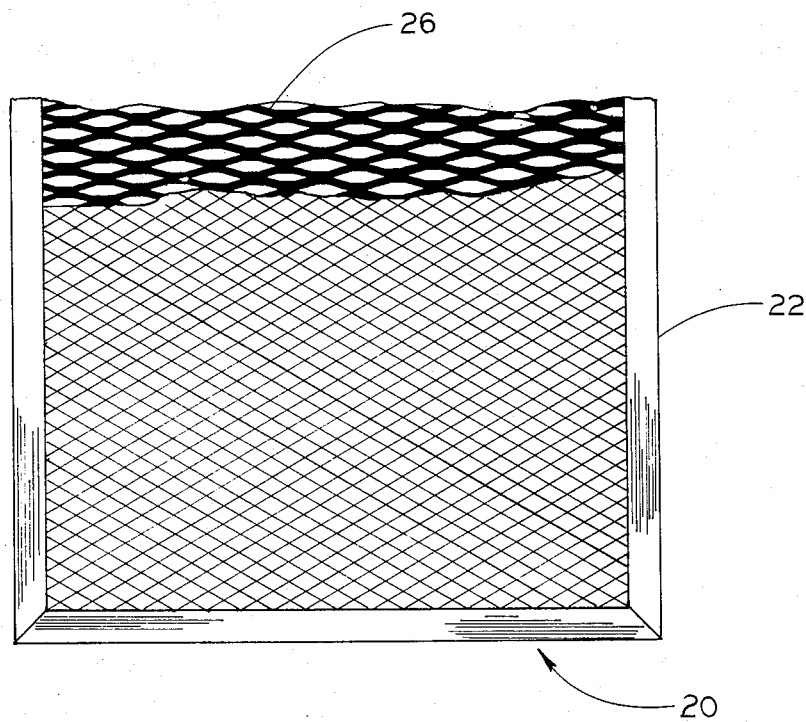
Figure 2:
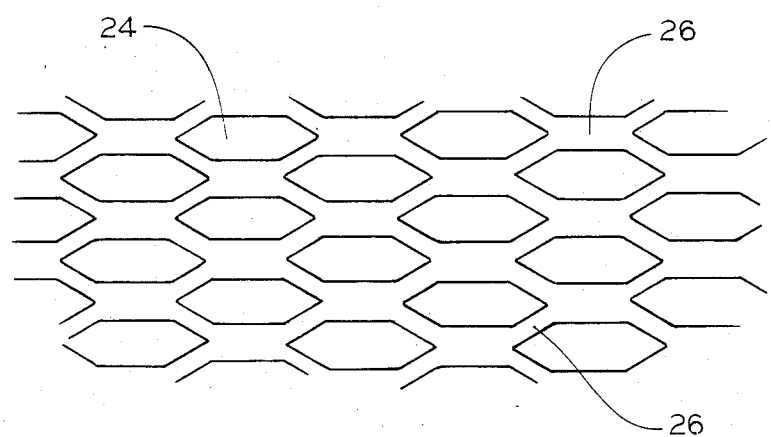

A gaseous filter media for odor removal applications constructed in accordance with the present invention is illustrated in FIGS. 1 and 2.

The filter media, indicated generally at 20, comprises a sheet of non-woven material provided with a plurality of slit and expanded openings 24 created in the sheet by automatic machinery of the type used to slit and expand paper and metal products. The sheet material may be cut to size and supported in a conventional metal frame 22 which may include an expanded metal front and rear face if desired. It also may be combined with fiber glass or other forms of particulate media mounted in association with the frame 22.

The non-woven sheet material 20 comprises a composition which includes a combination of cellulosic and synthetic fiber content which permits a significant impregnation of very fine activated carbon particles and also possesses sufficient characteristics to be processed on automatic expanding machinery at low cost in high volume production.

Such characteristics include sufficient tear and tensile strength so as to be capable to withstand the high speed cutting action of the knife blades of such machinery to make a sufficiently clean cut necessary to adopt the proper expanded form after processing.

The nature of the slit and expanding process produces a generally diamond shaped opening, such as at 24.

Each opening 24 possesses the desired diamond shaped configuration when not fully stretched to the maximum possible size. The sides of each opening 24 form a webbing 26 which is shared with the adjacent openings 24.

The openings 24 are relatively uniform in size and shape. Further, the angular desposition of the webbings 26 relative to the perpendicular direction of air flow to the face of the filter tends to create a more tortiuous path for the air flow to increase the adsorption efficiency without unduly increasing the pressure drop. Therefore, the resistance to air flow through the filter can be maintained at a relatively low value such that the pressure drop through the filter is in a range economically feasible in many moving air systems while maintaining an excellent degree of odor removal efficiency.

However, surprisingly, the odor removal efficiency does not decrease as much as expected with a given decrease in pressure drop through the sheet compared to the prior art filter media constructions.

The efficiency and capacity of adsorption of the sheet can be controlled within a relatively wide range by varying the amount and adsorption rating of the activated charcoal impregnated into the fibrous sheet. However, typically, the amount of carbon loaded into the sheet is preferably as high as reasonably possible to increase its adsorption efficiency and capacity. The size and shape of openings 24 formed are designed to minimize the pressure drop and still provide sufficient surface area for contact with the gaseous flow. Typically, the sheet material may present an open area, preferably between at least 30 to as high as 65 percent. By employing slit and expanding techniques, providing such openings does not involve the loss of the base non-woven sheet material such as would occur if holes were punched in the sheet to make the openings.

Compositions of the non-woven sheet material which are suitable for impregnation with adequate amounts of activated carbon and for commercially viable processing on slit and expanding equipment are those which include cellulose fibers in an amount ranging between approximately 30 to 50 percent by weight of the total composition in combination with synthetic fiber materials in an amount ranging from approximately 1 to 10 percent of the total composition. The combined total of the fiber content must be at least approximately 40 percent or greater of the total composition. The percentages noted herein are all based upon the weight percent of the final composition.

Activated carbon is impregnated into the fiber composition in amounts of at least 35 to 50 percent of the total composition to be commercially useful in most odor removal applications. Also a latex binder material is preferably included in amounts ranging from approximately 2 to 4 percent to reduce dusting of the carbon particles. Suitable binders of this type include acrylics, styrenebutadiene, or chloride containing latices such as vinyl chloride, vinylidene chloride and ethylene vinyl chloride. The chloride containing binders are preferred in these filter applications due to their lower combustibility factor.

Additionally a wet strength resin is used in the composition to impart stiffness to the final sheet product and give the base sheet composition sufficient strength to withstand the conventional saturation process used to make the sheet on a conventional paper making machine. Approximately one-half of one percent of a wet strength resin, such as a melamine-formaldehyde type, has worked well for this purpose.

Typical representative cellulose fibers which may be employed in the sheet composition are kraft, alpha cellulose, rag, cotton linters, rayon and similar fibers. The synthetic fibers may be selected from nylon, rayon or polyesters.

Activated carbon may be those derived from coconut shell, coal, lignite or wood raw materials, with coconut shell being preferred. The activity level of the carbon may be selected on the basis of the particular application. Standard commercial quality gas phase carbon types usually employed are those having carbon tetrachloide activity levels between 50 to 60 percent and work well for purposes of the present invention.

Since the impregnation involves very fine particle sizes, the activated carbon present in the sheet material presents a significant increase in available surface area of odor adsoprtion particles to the flow of air through the filter compared to an equal weight of activated carbon of the relatively large particle size employed in prior art odor control filter media.

In order to meet various fire code safety standards, the sheet material also includes conventional flame retardant materials. Suitable materials of this nature for this application include phosphorous and nitrogen containing compounds having flame retardant characteristics in amounts ranging from 3 to 8 percent. However, other conventional flame retardant materials compatible with the processing of the sheet material may also be employed.

The carbon impregnated sheets for use in the present invention are made having a nominal thickness of approximately 25 to 50 thousandths of an inch.

In view of the foregoing description, it should be apparent that an odor control filter may be constructed which possesses improved odor removal efficiency at equal or lower pressure drops and yet may be manufactured more economically than comparable prior art filters. Test results have indicated that filters constructed in accordance with the present invention have improved odor control qualities between two to five times greater than present competitively marketed odor control filters at comparable pressure drop values.

What is claimed is:

1. An improved gaseous filter media construction for odor control comprising, in combination, a non-woven sheet material consisting essentially of a combination of the following materials on a weight percent basis; at least 30 to 50 percent of cellulosic fibers and at least 1 to 10 percent of synthetic fibers selected from a group consisting of nylon, acrylic and polyester materials, the combination of said fibers representing at least approximately 40 percent of the total composition of said sheet material which includes 35 to 50 percent of activated carbon impregnated into the fibrous composition of said sheet and an amount of wet strength resin material sufficient to permit said sheet to be formed by a conventional paper making machines; said sheet material being provided with a plurality of expanded slits to form a plurality of adjacently disposed openings having a generally diamond-shaped configuration.

2. The filter media construction defined in claim 1 wherein said sheet composition includes 2 to 4 percent of a latex binder material selected from a group comprising acrylic, styrene-butadiene, vinyl chloride, vinyladene chloride and ethylene vinyl chloride.

3. The filter media construction define in claim 1 wherein said sheet composition includes 3 to 8 percent of a flame retardant material selected from a group comprising phosphorous, nitrogen or phosphorous-nitrogen containing compounds having flame-retardant characteristics.

* * * * *